UNITED STATES PATENT OFFICE.

EDWARD D. KENDALL, OF ELIZABETH, NEW JERSEY, ASSIGNOR OF ONE-THIRD TO DICKSON Q. BROWN, OF NEW YORK, N. Y., AND ONE-THIRD TO ALBERT R. LEDOUX, OF CORNWALL, NEW YORK.

COMPOSITION OF MATTER.

1,105,568.     Specification of Letters Patent.     Patented July 28, 1914.

No Drawing.     Application filed November 3, 1911. Serial No. 658,370.

*To all whom it may concern:*

Be it known that I, EDWARD D. KENDALL, a citizen of the United States, residing at Elizabeth, in the county of Union and State of New Jersey, have invented a new and useful Composition of Matter for Use Particularly in the Manufacture of Corks, of which the following is a specification.

The particular object of my invention is to produce a cheap substitute for caoutchouc-corks which may be used also as a substitute for common corks.

My said composition consists essentially of guayule, balata, wood-pulp and sulfur, molded to the forms of corks and vulcanized.

The proportions of the constituents of my composition are preferably as follows: guayule, eleven parts; balata, ten parts; sulfur, one part (or a proportionate quantity of a sulfur-bearing chemical) and wood-pulp proportioned to produce the kind of corks desired (five to twenty parts or more), with reference particularly to hardness and resilience. The relative proportions of guayule, balata and sulfur may be varied somewhat: the larger the proportion of guayule the greater the elasticity of the corks (for ordinary use excessive elasticity is objectionable): with increased proportions of wood-pulp or balata or of sulfur harder corks are produced.

In the course of a long series of experiments and tests I have found that the addition to the constituents of my said composition of other gum or gums than those above named results in producing inferior qualities of corks or in material increase of cost, but the addition of small proportions of other gum or gums or adulterants would not depart from my invention. If it be required to modify the colors of the corks a small proportionate quantity of a suitable pigment may be added in the preparation of the composition, but such pigment should, of course, be of a character to resist the action of chemicals: for example: whitened corks may be obtained by the use of barium sulfate.

To prepare my said composition I first rasp, cut or otherwise comminute the guayule and balata and dissolve or soften the same with any suitable volatile solvent (such as petroleum-naphthas, benzol or its homologues, carbon disulfid, carbon tetrachlorid, &c.) and then add to and thoroughly mix with the same, by stirring, the required proportion of sulfur (or sulfur-bearing body): this semi-fluid mixture I thoroughly incorporate with a quantity of wood-pulp sufficient to form a dough-like mass; the proportions of wood-pulp may be widely varied to form corks of different degrees of hardness. The mass so formed may be spread on shelves of wire netting and the volatile solvent driven off by a current of warm air, but in large operations, in order to recover and repeatedly use the solvent liquid, it is preferable to provide any suitable, well-known form of still such as the kind which is furnished with a stirring device such as a rotating shaft having projecting arms, into this still putting the required quantity of dry wood-pulp and the semi-fluid mixture of guayule, balata, sulfur and liquid solvent, stirring the whole until all the constituents are thoroughly incorporated, then, with continuous stirring, applying moderate heat by the well-known means of steam or a water-bath, so distilling the volatile solvent, after which the solid mass in the still is to be removed while still warm and formed into corks at once or after several hours or days of exposure in a current of warm air to dissipate any last, lingering traces of the solvent. The corks are formed by pressing this solid composition into the well-known suitable molds and subjecting these to the heat of vulcanization in the usual way.

I claim—

The herein described composition of matter, molded in the forms of corks and vulcanized, and consisting of guayule, eleven parts; balata, ten parts; sulfur, one part; and wood pulp, five to twenty parts, proportioned to produce the kind of corks required substantially as described.

EDWARD D. KENDALL.

Witnesses:
W. R. WEMPII,
RODOLFO TOVANY.